Sept. 14, 1965   H. ABERMETH   3,206,108
ROTARY PISTON INTERNAL COMBUSTION ENGINE
Filed April 1, 1963
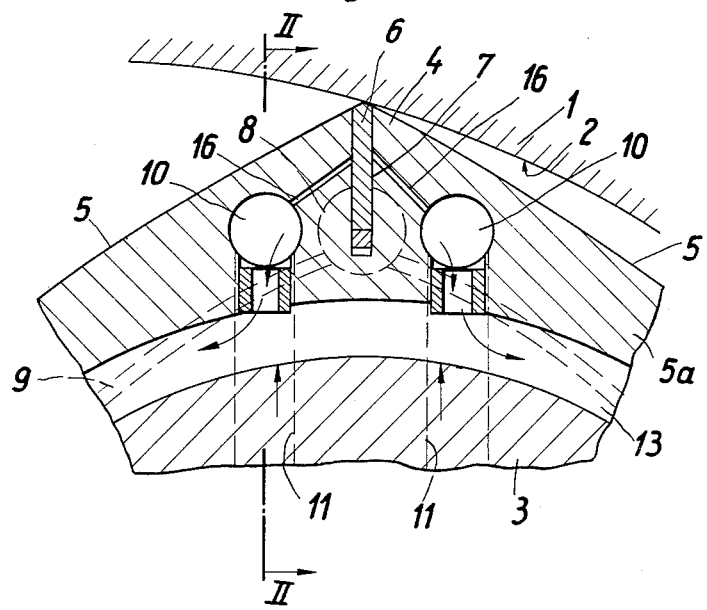
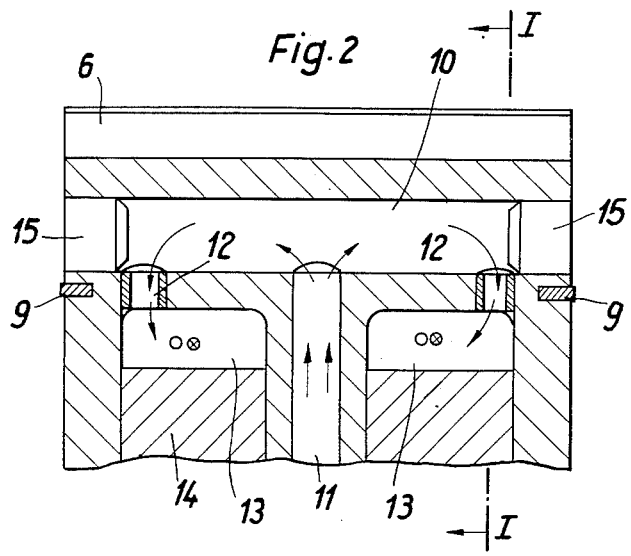
Inventor:
Hubert Abermeth
By
Walter Becker

United States Patent Office 3,206,108
Patented Sept. 14, 1965

3,206,108
ROTARY PISTON INTERNAL COMBUSTION ENGINE
Hubert Abermeth, Cologne, Germany, assignor to Klockner-Humboldt-Deutz Aktiengesellschaft, Cologne, Germany
Filed Apr. 1, 1963, Ser. No. 269,484
Claims priority, application Germany, Apr. 2, 1962, K 46,348
4 Claims. (Cl. 230—210)

The present invention relates to a rotary piston internal combustion engine which comprises an outer or enveloping body with side walls and having a rotary piston eccentrically and rotatably journalled in said outer body. This circumferential surface of said piston is, in conformity with the contour of the inner enveloping surface of said outer body, provided with ridges extending in the direction of the axis of rotation of said rotor while said ridges are provided with grooves having arranged therein sealing strips for sealing the working chambers of the machine relative to each other.

It is an object of this invention to provide an improved rotary piston internal combustion engine of the abovementioned type which will protect the sealing strips against too high a thermic stress.

It is another object of this invention to provide a rotary piston internal combustion engine of the above-outlined type which will be provided with an effective cooling system for the sealing strips.

These and other objects and advantages of the invention will appear more clearly from the following specification in connection with the accompanying drawing, in which:

FIGURE 1 represents a vertical cross-section through a portion of a ridge containing section of the piston and the adjacent portion of the inner confining surface of the outer or enveloping body of a rotary piston internal combustion engine, the section of FIGURE 1 being taken along the line I—I of FIGURE 2;

FIGURE 2 is a section taken along the line II—II of FIGURE 2.

The present invention is characterized primarily in that at both sides of each sealing strip and over the width of the piston parallel or at least approximately parallel to the longitudinal extension of the sealing strips, there are provided passages for conveying a cooling medium. The invention is furthermore characterized in that the said passages are provided with feeding and discharging conduit means for the cooling medium, which feeding and discharging conduit means are arranged within the piston. Such an arrangement furnishes an effective cooling system for cooling the sealing ridges, which is of great advantage inasmuch as in particular the sealing strips are subjected to a high thermic load.

According to a further development of the invention, the conduit means for feeding of the cooling medium is located in the plane of symmetry of the piston. Advantageously, at both sides of the conduit means for feeding the cooling medium adjacent the end faces of the piston, the conduit means for discharging the cooling means are provided. If desired, throttling elements may be inserted in the discharging conduit means whereby the flow-through of the cooling medium may be effected in an expedient manner.

For purposes of the particularly through cooling of the sealing, strips according to a further development of the invention, the cooling medium for cooling the grooves adjacent the sealing strips is not to be employed for cooling of other parts. In other words, the grooves containing the cooling strips receive a non-preheated cooling medium.

In most instances, the lubricating oil for the rotary piston internal combustion engine is used as cooling medium. Therefore, it is particularly advantageous to connect the grooves for the sealing strips by bores or conduits with the cooling passages. In this way, simultaneously, a good lubrication of the most sensitive parts of the rotary piston internal combustion engine will be effected.

Referring now to the drawing in detail, the rotary piston internal combustion engine illustrated therein is a so-called circular piston internal combustion engine in which the outer or enveloping body 1 together with the side walls forms the stationary machine part, and in which the piston in the interior of said outer body moves on an eccentric shaft journalled in said outer body. The movement of the piston and the movement of the eccentric shaft are controlled by a special gear transmission.

The outer body 1 has an inner confining surface 2 conforming in contour to an epitrochoid with two axis-near zones. The piston 3, whose circumferential surface 5 is designed in conformity with the inner confining surfaces of said epitrochoid, has three ridges 4 (one only being shown) which, in cooperation with the inner enveloping surface of the outer body and the side walls, seal the working chambers of the machine relative to each other. For purposes of improving the sealing action of said ridges, said ridges are provided with grooves 7 respectively having sealing strips 6 mounted therein. Groove 7 leads at its inner side to a so-called sealing bolt 8 which serves as connecting member between the entire sealing system of piston 5. The entire sealing system of the piston comprises the sealing strips 6 and the laterial sealing strips 9 which seal against the side walls of the circular piston internal combustion engine.

The circular piston internal combustion engine according to the invention is furthermore characterized in that on both sides of each sealing strip 6 over the width of the piston 8 there are provided passages 10 which are parallel or approximately parallel to the sealing strips 6. The passages 10 communicate with conduit means for feeding a cooling medium into and discharge a cooling medium from passages 10, said conduit means being provided within the piston 3. The supply of cooling medium is effected along the plane of symmetry of the piston 4. To this end there is provided a central pasage 11 for feeding the cooling medium. On both sides of passage 11, near the end faces of the piston, there are provided discharge conduit means 12 for discharging the cooling medium. These discharge conduit means 12 are short passages formed by throttling elements and lead into an annular passage 13 for the cooling medium. Passage 13 is formed by an outer portion of the piston and an inner part 14 thereof. The cooling passages 10 are closed by lateral closure members 15.

As has been brought out above in the introductory portion to this specification, it is advantageous to supply fresh cooling medium through passage 11. Inasmuch as in most instances the cooling medium also forms the lubricant for the machine, the supply of the lubricant is effected through passages 11 through the eccentric shaft. The eccentric shaft is in a manner known per se provided with passages and annular grooves permanently communicating with passage 11.

For purposes of lubricating the sealing strip 6, bores 16 are provided with established communication between the cooling passages 10 and the grooves 7 in the ridges 4 of piston 3.

It is, of course, to be understood that the present invention is, by no means, limited to the particular construction show in the drawing but also comprises any modifications within the scope of the appended claims.

Thus, the invention is not limited to circular piston internal combustion engines but may also be employed in connection with any type of rotary piston internal combustion engines, which means also with so-called rotary piston internal combustion engines in which both the piston and the outer or enveloping body rotate about a machine shaft. The invention is furthermore not limited to internal combustion engines of the type mentioned above but also is applicable to any type of compressors and pumps.

What I claim is:

1. A rotary piston internal combustion engine having a rotary piston and an enveloping body, said piston having its circumference provided with axially extending zenith edges provided with axial grooves, sealing strips in said grooves adapted to seal the working chambers of the engine formed by the piston and body with regard to each other, the piston being provided with passages and cavities adapted to convey a liquid cooling medium which also serves as lubricant, said passages including radial passages in the piston substantially in the axially located central transverse plane of the piston, axial passages in the piston extending on both sides of and substantially parallel to and adjacent each said groove and closed at the opposite ends of the piston, said radial passages communicating with said axial passages near the middle of the latter, other passages in the piston extending substantially radially toward the axis of the piston and communicating with said axial passages near the opposite ends thereof, and substantially annular chamber means in the piston communicating with the radially inner ends of said other passage means.

2. A rotary piston internal combustion engine according to claim 1, in which throttling elements are provided disposed in said other passages so as to control the flow of cooling medium in said passages.

3. A rotary piston internal combustion engine according to claim 2 in which the cooling fluid is introduced into said radial passages and flows therefrom to said axial passages to provide for an intensive cooling of said zenith edges and the said sealing strips.

4. A rotary piston internal combustion engine according to claim 3 which includes bores extending from said axial passages to said grooves to supply fluid from said axial passages directly to said grooves and the sealing strips therein.

References Cited by the Examiner

UNITED STATES PATENTS

| | | | |
|---|---|---|---|
| 2,136,117 | 11/38 | Nichols | 230—210 |
| 2,246,271 | 6/41 | Davidson | 230—205 X |
| 3,016,184 | 1/62 | Hart | 230—205 X |
| 3,102,682 | 9/63 | Pascke | 230—210 X |

LAURENCE V. EFNER, *Primary Examiner.*

ROBERT M. WALKER, *Examiner.*